United States Patent
Chen et al.

(10) Patent No.: US 6,798,676 B2
(45) Date of Patent: Sep. 28, 2004

(54) INVERTER FOR CHANGING DIRECT CURRENT TO ALTERNATING CURRENT

(75) Inventors: Wei-Kuang Chen, Taoyuan (TW); Te-Jen Yang, Taoyuan (TW)

(73) Assignee: Cotek Electronic Industrial Co., Ltd. (TW)

( * ) Notice: Subject to any disclaimer, the term of this patent is extended or adjusted under 35 U.S.C. 154(b) by 0 days.

(21) Appl. No.: 10/351,005

(22) Filed: Jan. 24, 2003

(65) Prior Publication Data

US 2004/0145921 A1 Jul. 29, 2004

(51) Int. Cl.[7] .............................................. H02M 5/42
(52) U.S. Cl. ....................................... 363/98; 363/17
(58) Field of Search .............................. 363/15, 16, 17, 363/95, 97, 98, 131, 132

(56) References Cited

U.S. PATENT DOCUMENTS 5,519,598 A * 5/1996 Sakai et al. .................... 363/20
5,625,539 A * 4/1997 Nakata et al. ................. 363/17
5,696,670 A * 12/1997 Roederer et al. ........... 363/21.18

* cited by examiner

*Primary Examiner*—Michael Sherry
*Assistant Examiner*—Gary L. Laxton

(57) ABSTRACT

A DC to AC inverter includes a bridge type switch circuit, a transformer, an integrated circuit, a pulse width modulator, a wave generator and a control-drive circuit. The switch circuit is connected to a direct current power source and has two alternating current ends with one of the alternating current ends connecting with an energy storage inductor in series and then connecting with an input end of the transformer and the other input end of the transformer being connected to the other alternating current end. The current waves at both of the alternating current ends are detected and the waves are integrated and sent to a feedback end of the pulse width modulator. The wave generator produces half period of sine waves for a reference potential end and low frequency (50 Hz or 60 Hz) square waves for the control-drive circuit operating the pulse width modulator and the square waves and sending control signals to the switch circuit. The direct current can be converted to the alternating current by way of a switch circuit and a transformer such that the circuit structure can be simplified and the reliability can be enhanced with economical cost.

3 Claims, 11 Drawing Sheets

INVERTER FOR CHANGING DIRECT CURRENT TO ALTERNATING CURRENT

BACKGROUND OF THE INVENTION

1. Field of the Invention

The present invention relates to a DC to AC inverter, and particularly to an inverter, with which the direct current (DC) can be changed to the alternating current (AC) by means of a switch circuit and a transformer so as to simplify the circuit structure and enhance the reliability for saving the cost.

2. Description of Related Art

A conventional circuit for inverting the direct current to the alternating current includes a voltage rise circuit (10'), a bridge type rectifier (20'), a filtering capacitor (C2'), two pulse width modulators (PWM1, PWM2), a bridge type switch circuit (10) and a control-drive circuit (40). The voltage rise circuit (10') has switch transistors (Q1, Q2) and a transformer (T1) to form a push-pull type voltage rise circuit (10') with a DC input positive end being connected to a central node of the transformer (T1). The transformer (T1) further connects with a DC negative input end via the switch transistors (Q1, Q2) Under the control of the pulse width modulator (PWM1), the input direct current can obtain a voltage rise via the transformer (T1) and the switch transistors (Q1, Q2) and output with a high voltage from the secondary side of the transformer (T1). The high voltage current is rectified with the bridge type rectifier (20'), which has four rectifying diodes (D1–D4), and filtered with the filtering capacitor (C2') so as to obtain a stable direct current with a high voltage. The high voltage direct current is led to the bridge type circuit (10), which is composed of four switch transistors (Q3–Q6), and can produce a pulse width modularized low frequency (=Hz or 60 Hz) waves by means of the pulse width modulator (PWM2) so as to be output with alternating current via the control-drive circuit (40). However, the pulse width modulators (PWM1, PWM2) can be operated with low frequency only so that it is possible for the pulse width modulators (PWM1, PWM2) to control the output voltage of the alternating current only and the output wave is incapable of being controlled. Thus, the output wave is a modified sine wave as shown in FIG. 2 instead of a pure sine wave.

Next, another conventional DC to AC inverter is illustrated in FIG. 3 and the second conventional inverter has been added an energy inductor L1 and has a wave generator (30) in the control-drive circuit (40) so as to produce a low distorted sine wave for the pulse width modulator (PWM2) being capable of performing comparison. The output of the pulse width modulator (PWM2) can be shifted to signals required by the switch transistors (Q3–Q6) via the control-drive circuit (40) and the signals drive the bridge type switch circuit (10), which is composed of the four switch transistors (Q3–Q6), so that the switches can be operated with a change between a high frequency and a low frequency. The output with a low distorted sine wave can be obtained after being energy saved and filtered with the energy storage inductor L1. However, the second conventional inverter has to be provided with a transformer, two stages of switch circuits (10')(a push-pull type voltage rise circuit composed of switch transistors (Q1, Q2) and a bridge switch circuit (10) composed of four switch transistors (Q3–Q6)) and a rectifying and filtering circuit (a bridge type rectifier (20') composed of rectifying diodes (D1–D4) and a filtering capacitor (C2')). The preceding parts need large power to result in large stress and it is easy to become out of order. Further, the preceding circuits need a lot of components so that the inverter is high in cost.

In addition, the preceding conventional inverter at the output end thereof is a switch circuit (10) composed of four switch transistors (Q3–Q6) and the switch circuit (10) is operated under a state of high voltage. Once the output is overload or short circuit, the four switch transistors (Q3–Q6) are easy to be burned due to extra large instantaneous power. As a result, the circuit is hard to be protected with high production cost and unfavorable reliability.

SUMMARY OF THE INVENTION

An object of the present invention is provide a DC to AC inverter, which includes a bridge type switch circuit, a transformer, an integrated circuit, a pulse width modulator, a wave generator and a control-drive circuit. The switch circuit is connected to a direct current power source and has two alternating current ends with one of the alternating current ends connecting with an energy storage inductor in series and then connecting with an input end of the transformer and the other input end of the transformer being connected to the other alternating current end. The current waves at both of the alternating current ends are detected and the waves are integrated and sent to a feedback end of the pulse width modulator. The wave generator produces half period of sine waves for a reference potential end and low frequency (=Hz or 60 Hz) square waves for the control-drive circuit operating the pulse width modulator and the square waves and sending control signals to the switch circuit. The direct current can be converted to the alternating current by way of a switch circuit and a transformer such that the circuit structure can be simplified and the reliability can be enhanced with economical cost.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
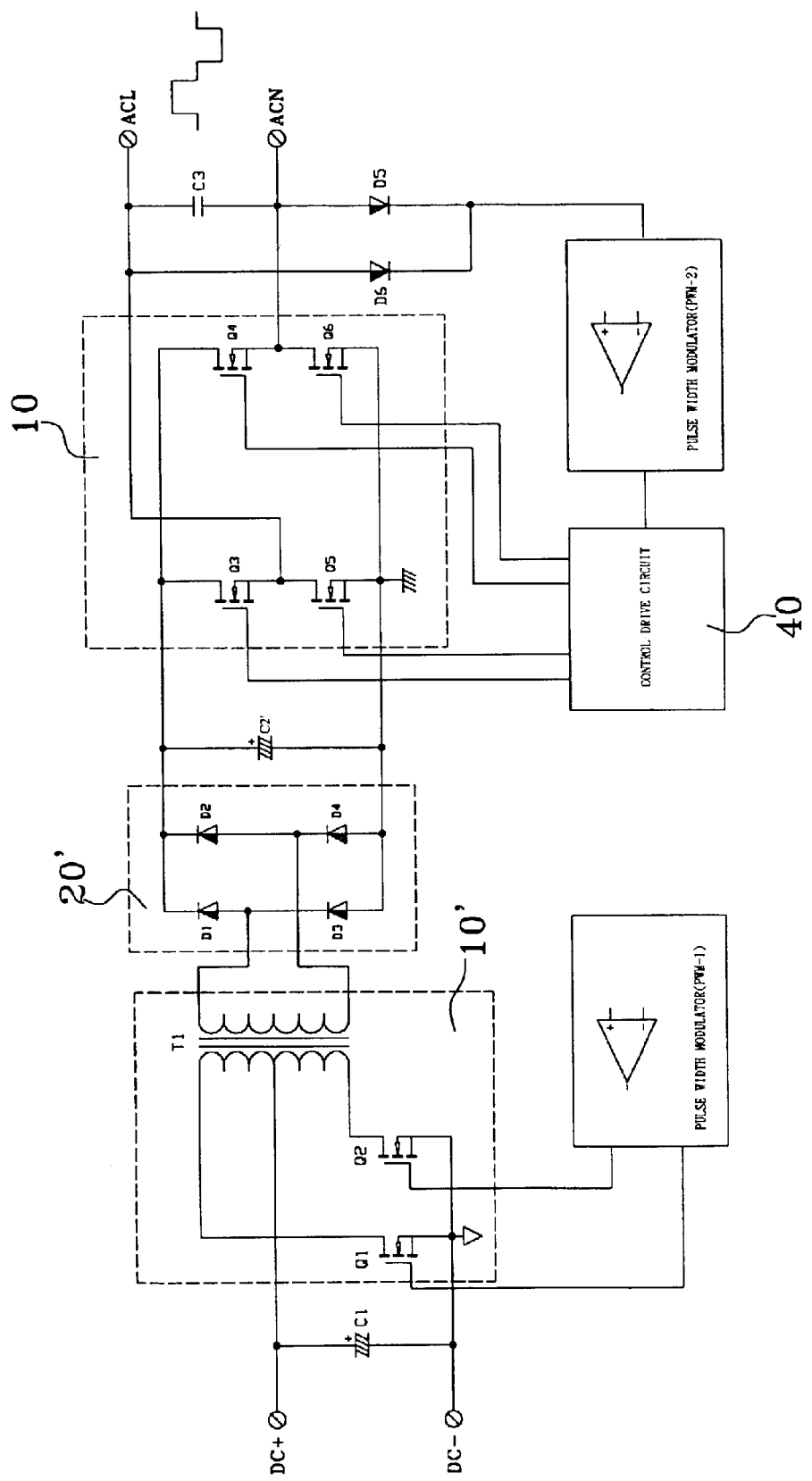
FIG. 1 is a circuit diagram of a conventional DC to AC inverter.
Figure 2:
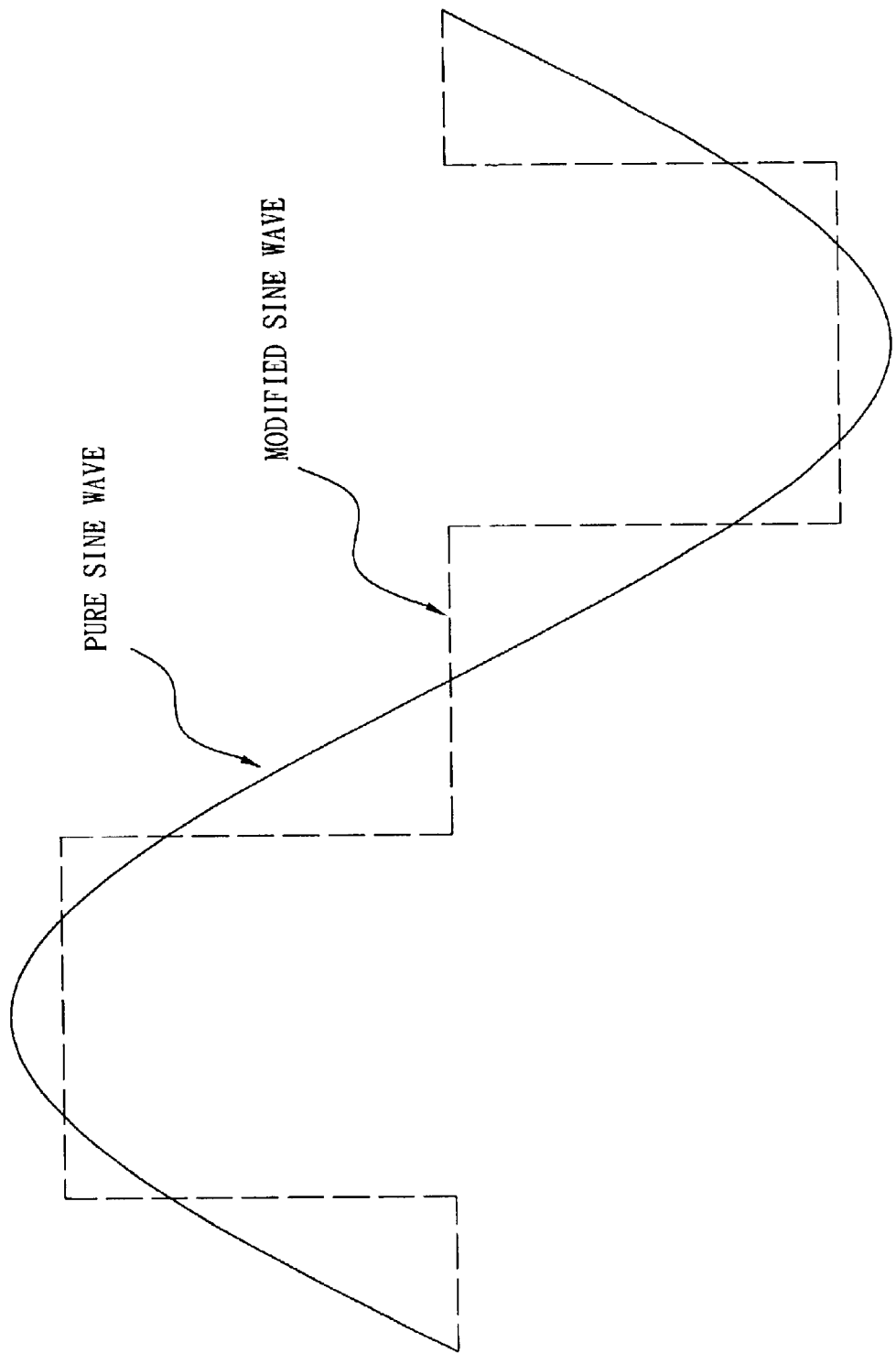
FIG. 2 is a graph showing a modified sine curve generated by the conventional DC to AC inverter.
Figure 3:
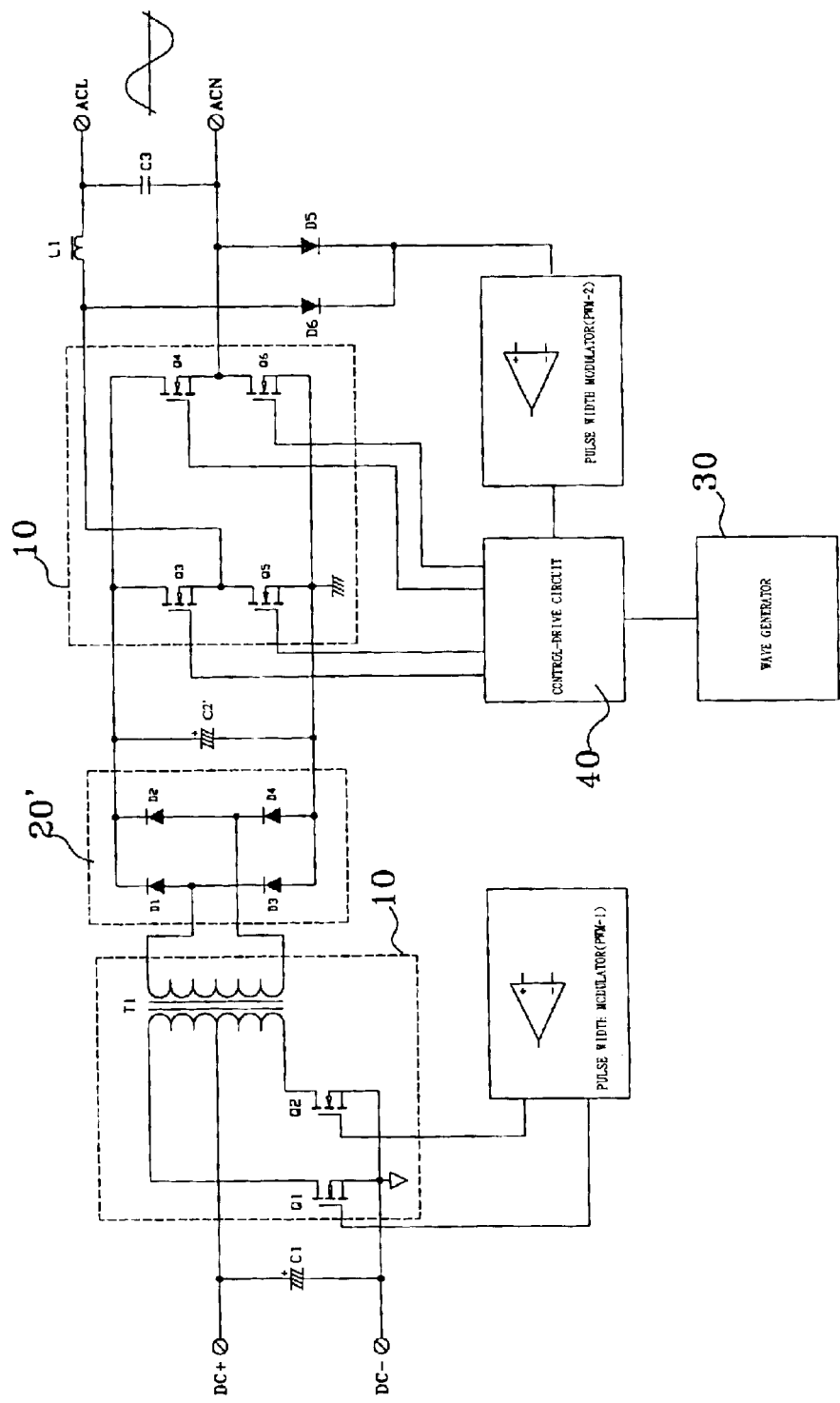
FIG. 3 is a circuit diagram of another conventional DC to AC inverter.
Figure 4:
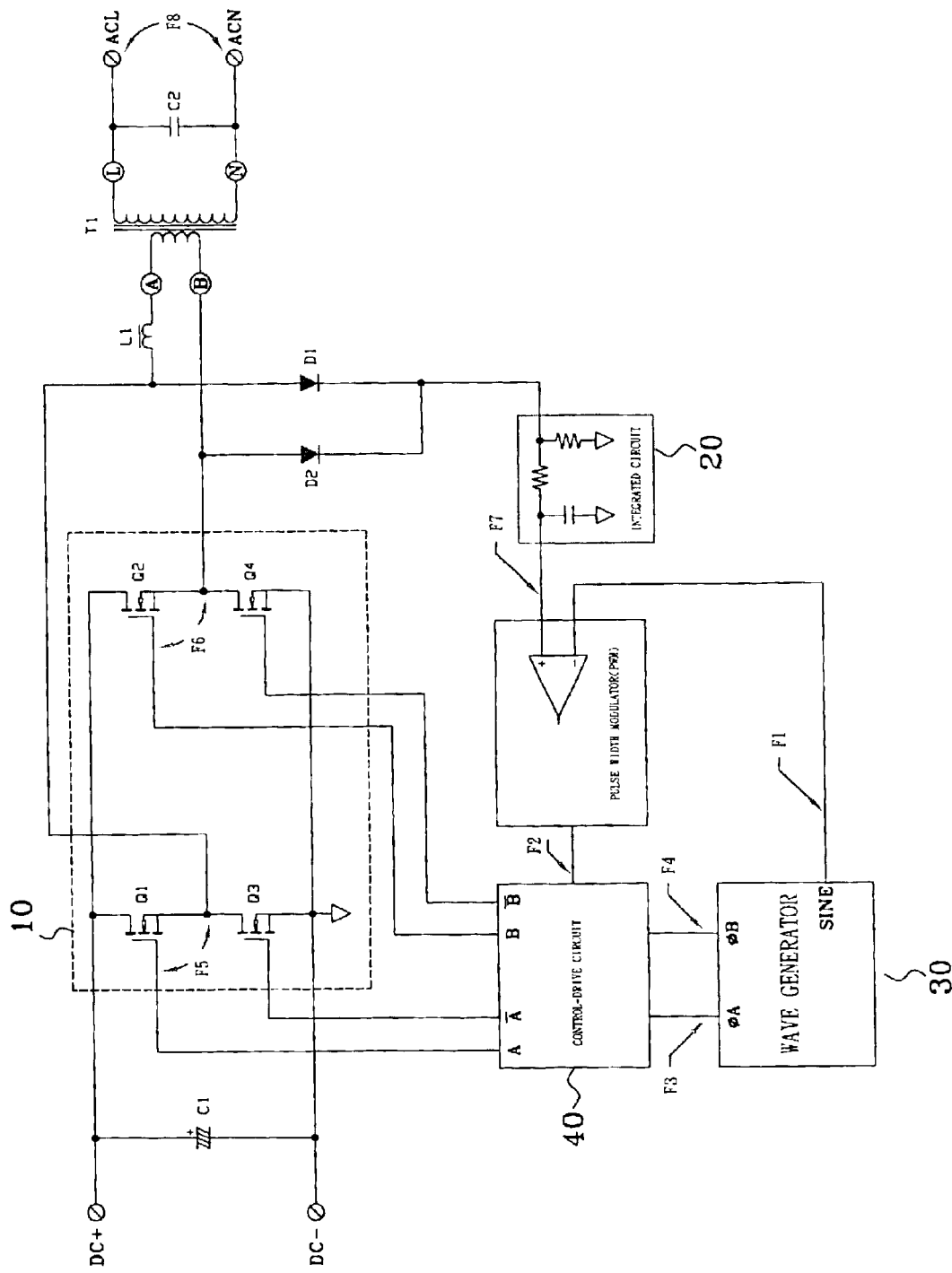
FIG. 4 is a circuit diagram of a DC to AC inverter according to the present invention.

First of all, referring to FIG. 4, a DC to AC inverter according to the present invention includes a switch circuit (10), a transformer (T1), a pulse width modulator (PWM), an integrated circuit (20), a wave generator (30) and a control-drive circuit (40).

The switch circuit (10) is a bridge type switch circuit formed of four switch transistors (Q1–Q4) being connected to each other and the bridge type switch transistors (Q1–Q4) are metal oxide semiconductor-field effect transistors (MOS-FET). The switch circuit (10) at an end thereof is joined to a DC power source and at an alternating current end thereof connects with an energy storage inductor L1 in series. The inductor L1 is connected to an input end of the transformer (T1).

The transformer (T1) at another input end thereof is connected to another alternating current end of the switch circuit (10) and both alternating current ends of the switch circuit (10) further connects with a diode (D1, D2) respectively.

The integrated circuit (20) is composed of resistors and capacitors or is a low pass filter composed of operational magnifier. The integrated circuit (20) at the input end thereof is connected to the two diodes (D1, D2) and at the output end thereof is connected to a feedback end of the pulse width modulator (PWM).

Figure 5:
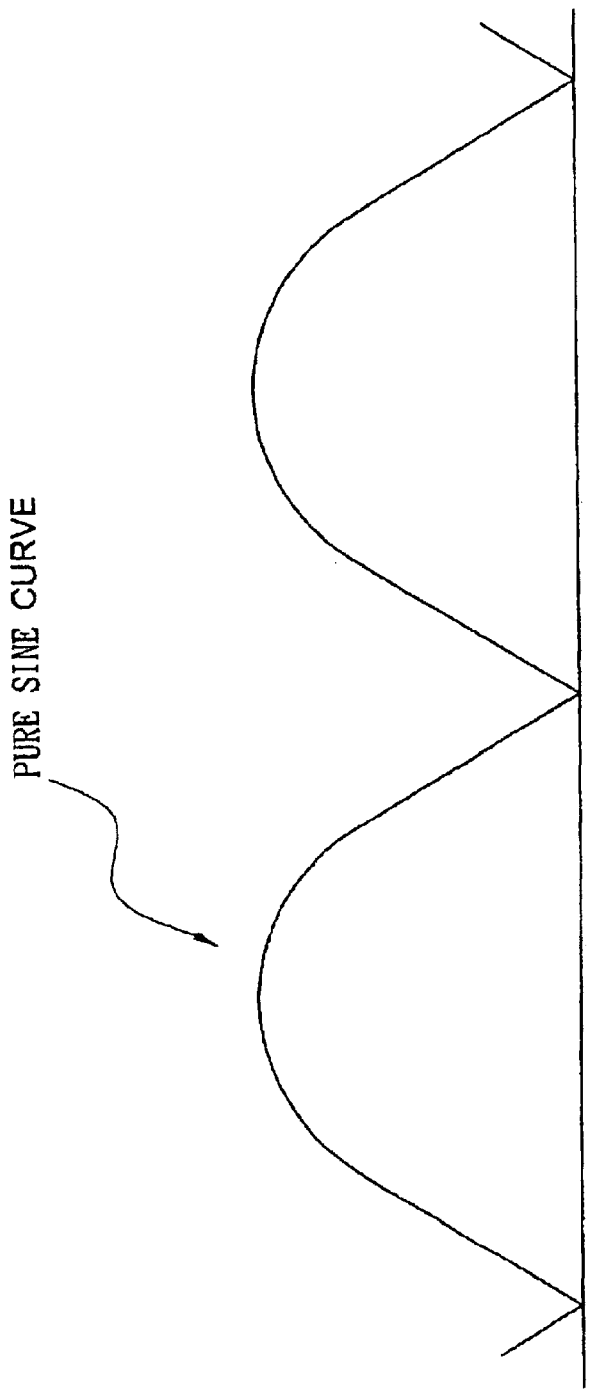
FIG. 5 is a graph showing a pure sine curve produced by a wave generator according to the present invention.

The pulse width modulator (PWM) at a reference potential end thereof is connected to the wave generator (30) so as to admit the pure sine wave as shown in FIG. 5 from the wave generator (30) and at a feedback end thereof is connected to an output end of the integrated circuit (20). Hence, an output pulse width thereof can be regulated based on a result obtained via the sine wave being compared to a wave from the integrated circuit 20.

Figure 6:
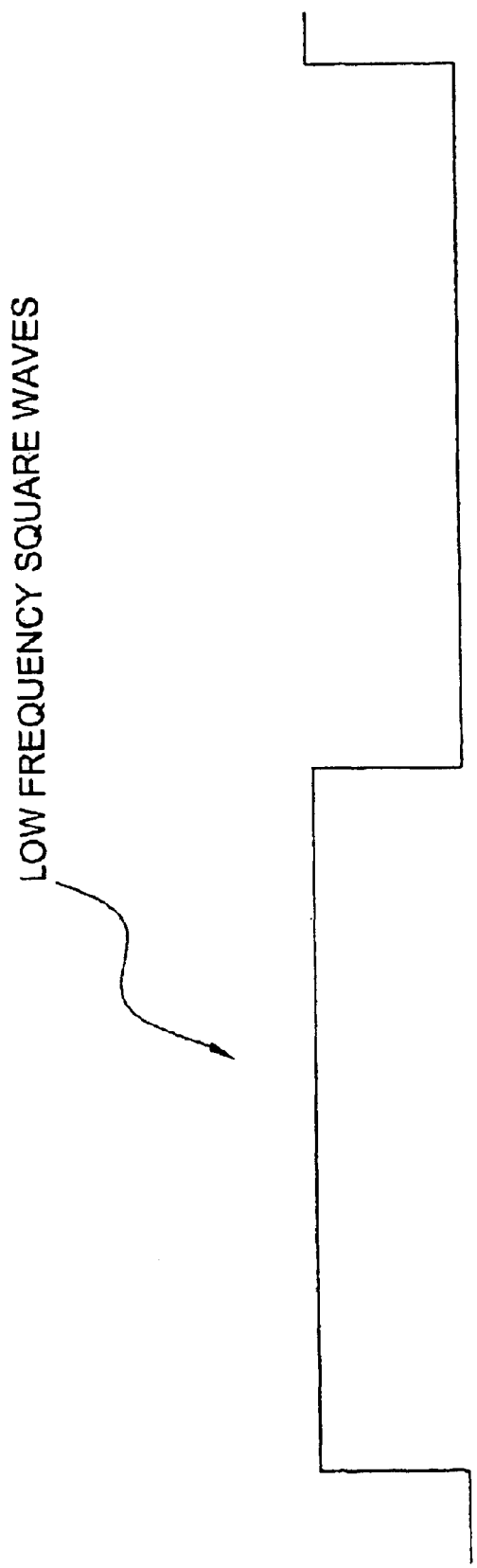
FIGS. 6 and 7 are graphs showing low frequency square waves produced by the wave generator of the present invention.
Figure 7:
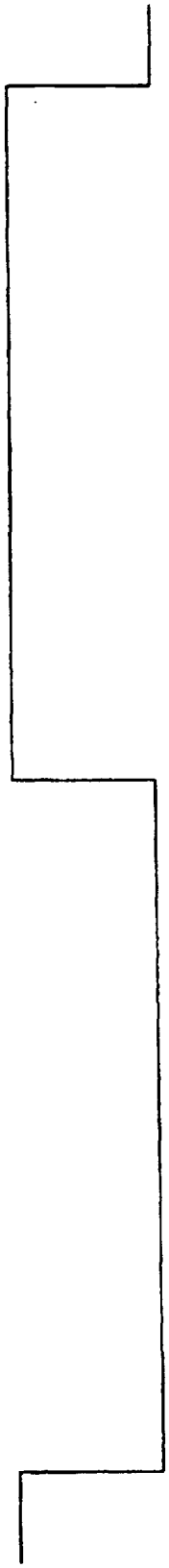

The wave generator (30) is made of an oscillation circuit or a single chip microprocessor, which performs simple functions such that a half-periodical pure sine wave and two low frequency (=Hz or 60 Hz) square waves, which have an identical frequency and an individual phase inversed to each other as shown in FIGS. 6 and 7, for of offering the control-drive circuit (40). Further, one of the two low frequency square waves can be produced by the wave generator (30) and the other low frequency square wave can be formed of a not gate.

The control-drive circuit (40) is to operate the output of the pulse width modulator (PWM) and the low frequency square waves produced by the wave generator (30) so as to supply control signals needed by the switch circuit (10).

Figure 8:
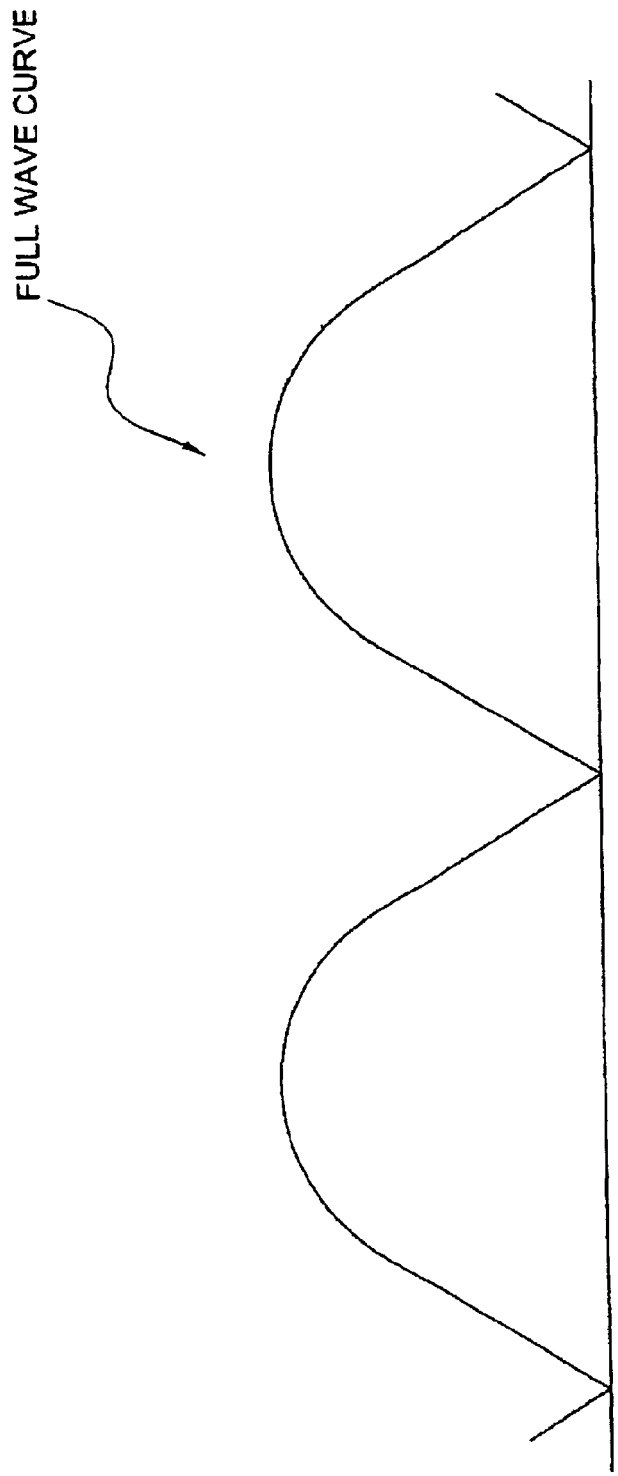
FIG. 8 is a graph showing a full wave curve output with an integrated circuit according to the present invention.
Figure 9:
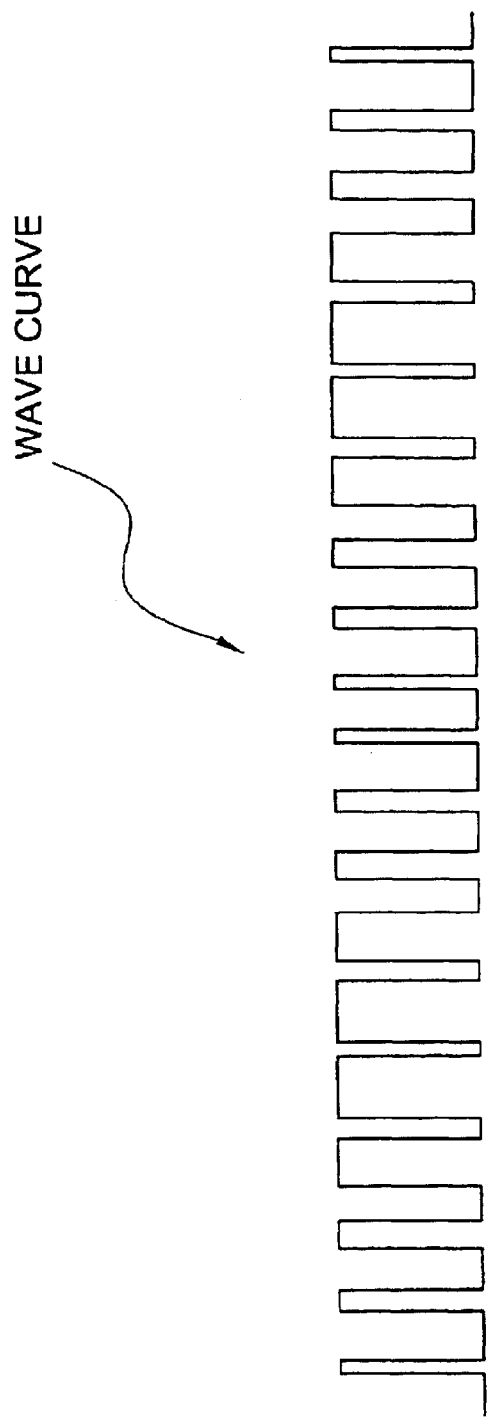
FIG. 9 is a graph showing a wave curve output with a pulse width modulator according to the present invention.
Figure 10:
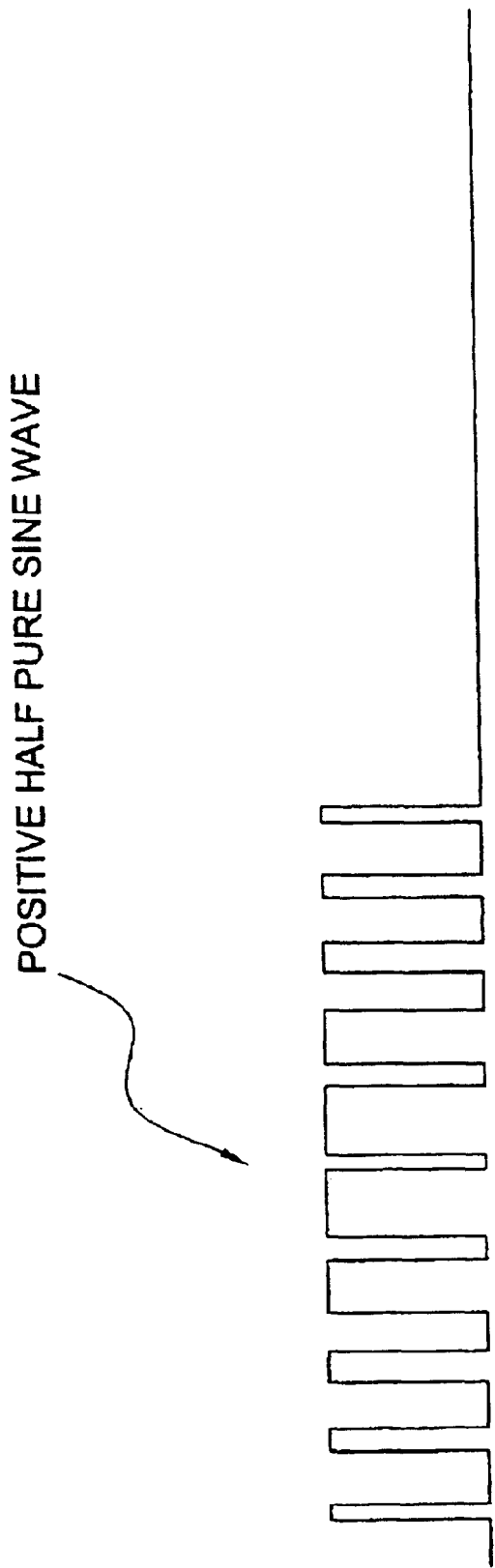
FIG. 10 is a graph showing a positive half pure sine wave synthesized with a control-drive circuit according to the present invention.
Figure 11:
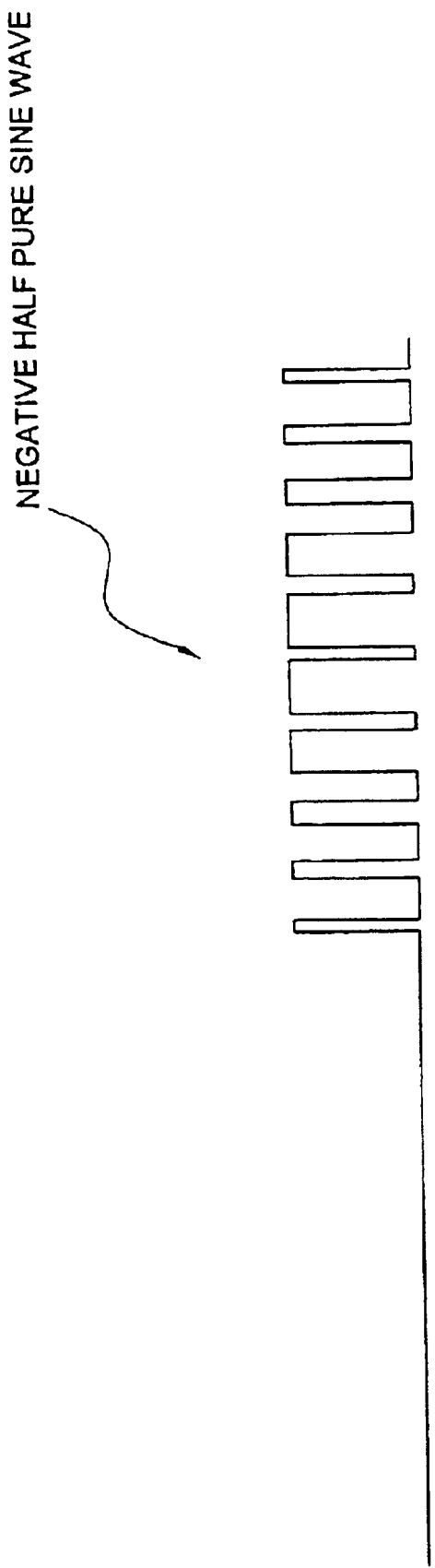
FIG. 11 is a graph showing a negative half pure sine wave synthesized with the control-drive circuit of the present invention.

The wave generator (30) can produce a low distorted sine wave (F1) as shown in FIG. 5 and the sine wave (F1) is guided to the pulse width modulator PWM as a reference voltage. The two low frequency (60 Hz or 50 Hz) square waves (F3), (F4) have a respective phase to be inversed to each other. Besides, voltages detected by the two diodes (D1, D2), which are connected to the alternating current end of the bridge type switch circuit, are filtered out high frequencies thereof and kept low frequencies thereof so as to obtain a full wave (F7) as shown in FIG. 8 for being compared with the pulse width modulator (PWM). The output of the pulse width modulator (PWM) can be adjusted the pulse width (F2) thereof as shown in FIG. 9 according to magnitudes of the reference voltage and detected voltage. The output pulse is synthesized with the low frequency square waves via the control-drive circuit (40) to produce two wave signals, which have a high frequency pulse width and a low frequency square wave respectively. One of the two signals is a wave (F5) as shown in FIG. 10 to control the switch transistors (Q1, Q4) in a state of close circuit during the positive half sine wave and the other one of the two signals is a wave (F6) to control the switch transistors (Q2, Q3) in a state of close circuit as shown in FIG. 11 during the negative half sine wave.

While the sine wave is in the half positive period, the switch transistors (Q1, Q4) can be high frequency switched to on/off such that the current can be input and reached to end A of the transformer T1 via the direct current positive end, the switch transistor Q1, the energy storage inductor L1. Then, the current can be back to the negative end of the direct current power source via end B of the transformer T1. In case of the switch transistors Q1, Q4 being in a state of ON, the energy storage inductor L1 can save part of the energy and in case of switch transistors Q1, Q4 being in a state of OFF, the part of the energy can be released to the transformer T1. While the sine wave is in the half negative period, the switch transistors (Q2, Q3) can be high frequency switched to on/off such that the current can be input to end B of the transformer T1 via the direct current positive end and the switch transistor Q2. Then, the current can be back to the negative end of the direct current power source via end A of the transformer T1, the energy inductor L1 and the switch transistor Q3. In case of the switch transistors Q2, Q3 being in a state of ON, the energy storage inductor L1 can save part of the energy and in case of switch transistors Q2, Q3 being in a state of OFF, the part of the energy can be released to the transformer T1.

During the operation of the switch circuit (10), the amount of energy saved in the energy storage inductor L1 is decided by the corrected pulse width produced by the pulse width modular (PWM) due to the change of the output voltage. Because the energy storage inductor L1 provides a function of energy saving, the output voltage can increase to a maximum value from zero and then decrease to zero again by way of sine wave as soon as the switch circuit (10) is in operation. Further, after the high frequency current from the switch circuit (10) being treated by the energy storage inductor (L1) due to the energy storage effect of the energy storage inductor (L1), only the low frequency alternating current can be obtained and the required sine waved alternating current can be output via coils in the transformer (T1) proportionally increasing voltages so that it is not necessary to use any other part for filtering high frequency current.

While the invention has been described with reference to a preferred embodiment thereof, it is to be understood that modifications or variations may be easily made without departing from the spirit of this invention, which is defined by the appended claims.

What is claimed is:

1. An inverter for changing direct current to alternating current, comprising:

a switch circuit, providing a direct power source end to connect with a direct current power source directly, four metal oxide semiconductor-field effect transistors (MOS-FETs) and two alternating current ends;

an energy storage inductor, having an end thereof being connected to one of the alternating current ends in series;

a transformer, having an input end thereof being connected to another end of the energy storage inductor and having another input end thereof being connected to the other one of the alternating current ends;

two diodes, corresponding to and being connected to the two alternating current ends respectively;

an integrated circuit with an input end and an output ends, being composed of a plurality of resistors and capacitors and the input end thereof being connected to the diodes;

a pulse width modulator with a reference potential end, a feedback end and an output end, the feedback end being connected to the output end of the integrated circuit;

a wave generator, connecting with the reference potential end of the pulse width modulator and outputting a half-periodical pure sine wave, which is guided to the pulse width modulator as a reference voltage via the reference potential end, and two low frequency square waves; and a control-drive circuit, being connected to the output end of the pulse width modulator and to the wave generator and further being connected to the four transistors of the switch circuit;

wherein, an output pulse width from the integrated circuit can be regulated with the pulse width modulator by way of a result obtained by way of the half-periodical pure sine wave being compared to a wave from the integrated circuit; the output pulse is synthesized with the low frequency square waves and produces two wave signals, which are a high frequency pulse width and a low frequency square wave respectively, to be sent to the four transistors in the switch circuit from the control-drive circuit with one of the signals controlling two of the transistors being in a state of close circuit in case of the half periodical sine wave being positive and the other one of the signals controlling the other two of the transistors being in a state of close circuit in case of the half periodical sine wave being negative;

whereby, the direct current can be changed to alternating current via the inverter without need of any additional components for filtering high frequency current.

2. The inverter as defined in claim 1, wherein the two low frequency square waves provide a respective phase being inversed to each other.

3. The inverter as defined in claim 1, wherein one of the low frequency waves is produced with a not gate.

* * * * *